US012240013B2

(12) United States Patent
Scott et al.

(10) Patent No.: US 12,240,013 B2
(45) Date of Patent: Mar. 4, 2025

(54) METHODS OF APPLYING POWDER COATINGS TO PRODUCE FINISH EFFECTS

(71) Applicant: CoaterFX LLC, Reno, NV (US)

(72) Inventors: Ross Shelton Scott, Reno, NV (US); Kimberly Victoria Edwards Scott, Reno, NV (US)

(73) Assignee: CoaterFX LLC, Reno, NV (US)

( * ) Notice: Subject to any disclaimer, the term of this patent is extended or adjusted under 35 U.S.C. 154(b) by 0 days.

(21) Appl. No.: 18/007,289

(22) PCT Filed: Jul. 30, 2021

(86) PCT No.: PCT/US2021/043988
§ 371 (c)(1),
(2) Date: Jan. 27, 2023

(87) PCT Pub. No.: WO2022/026884
PCT Pub. Date: Feb. 3, 2022

(65) Prior Publication Data

US 2023/0278072 A1 Sep. 7, 2023

Related U.S. Application Data

(60) Provisional application No. 63/058,836, filed on Jul. 30, 2020.

(51) Int. Cl.
*B05D 3/02* (2006.01)
*B05D 3/04* (2006.01)
(Continued)

(52) U.S. Cl.
CPC ........... *B05D 7/576* (2013.01); *B05D 3/0218* (2013.01); *B05D 3/0254* (2013.01); *B05D 3/048* (2013.01);
(Continued)

(58) Field of Classification Search
CPC ......... B05D 7/576; B05D 3/12; B05D 3/0218
See application file for complete search history.

(56) References Cited

U.S. PATENT DOCUMENTS

| | | | |
|---|---|---|---|
| 2,538,562 | A | 1/1951 | Gustin et al. |
| 6,893,687 | B2 | 5/2005 | Maurus |

(Continued)

FOREIGN PATENT DOCUMENTS

| | | | |
|---|---|---|---|
| CN | 110252622 A | 9/2019 | |
| EP | 4188617 A1 | 6/2023 | |
| WO | 2022026884 A1 | 2/2022 | |

OTHER PUBLICATIONS

International Preliminary Report on Patentability for International Application PCT/US2021/043988, Report issued Jan. 31, 2023, Mailed on Feb. 9, 2023, 5 Pgs.

(Continued)

*Primary Examiner* — Dah-Wei D. Yuan
*Assistant Examiner* — Andrew J Bowman
(74) *Attorney, Agent, or Firm* — KPPB LLP

(57) ABSTRACT

Methods and processes for applying powder coat faux finishes, and power coat materials associated with such methods and processes are provided. Processes employ one or more partial powder coat layers along with physical texturing techniques to provide a variety of powder coated faux finish effects. Methods may utilize standard powder coating formulations in contrasting combinations to form suitable faux finishes. Faux finishing techniques using powder coating procedures may reproduce effects previously only obtainable with wet techniques, such as, for example, sponging, color washing, rag rolling, marbleizing, faux granite, strié, antiquing, verdigris, wood graining, weathered patina, etc. Kits of materials, including powder coating
(Continued)

materials and physical texturing equipment suitable to reproduce such faux finishes are also provided.

12 Claims, 8 Drawing Sheets

(51) Int. Cl.

| | |
|---|---|
| ***B05D 3/12*** | (2006.01) |
| ***B05D 3/14*** | (2006.01) |
| ***B05D 5/06*** | (2006.01) |
| ***B05D 7/00*** | (2006.01) |
| ***B44C 3/02*** | (2006.01) |
| ***B44D 5/10*** | (2006.01) |

(52) U.S. Cl.
CPC ............... *B05D 3/12* (2013.01); *B05D 3/142* (2013.01); *B05D 5/061* (2013.01); *B44C 3/02* (2013.01); *B44D 5/10* (2013.01)

(56) References Cited

U.S. PATENT DOCUMENTS

| | | | | |
|---|---|---|---|---|
| 7,507,440 | B2 | 3/2009 | Reising et al. | |
| 7,736,730 | B2 | 6/2010 | Jung et al. | |
| 9,586,232 | B2 | 3/2017 | Thompson et al. | |
| 2003/0185990 | A1 | 10/2003 | Bittner et al. | |
| 2005/0132930 | A1 | 6/2005 | Schlegel | |
| 2019/0217336 | A1* | 7/2019 | Bullard .................... | B05D 3/12 |
| 2020/0406295 | A1 | 12/2020 | Han et al. | |

OTHER PUBLICATIONS

International Search Report and Written Opinion for International Application No. PCT/US2021/043988, Search completed Oct. 15, 2021, Mailed Nov. 12, 2021, 09 Pgs.

Extended European Search Report for European Application No. 21850807.5, Search completed Aug. 28, 2024, Mailed Sep. 10, 2024, 6 Pgs.

* cited by examiner

METHODS OF APPLYING POWDER COATINGS TO PRODUCE FINISH EFFECTS

CROSS-REFERENCE TO RELATED APPLICATIONS

The current application is a U.S. national stage application of PCT Patent Application Serial No. PCT/US2021/043988, entitled "Methods of Applying Powder Coatings to Produce Finish Effects", filed on Jul. 30, 2021 which claims priority to U.S. Provisional Patent Application Ser. No. 63/058,836, entitled "Methods of Applying Powder Coatings to Produce Finish Effects", filed Jul. 30, 2020. The disclosures of PCT Patent Application Serial No. PCT/US2021/043988 and U.S. Provisional Patent Application Ser. No. 63/058,836 are hereby incorporated herein by reference in their entirety.

FIELD OF THE INVENTION

The current disclosure is directed to methods of applying powder coating finishes; and more particularly to methods of applying powder coating finishes to duplicate specific material faux finishes.

BACKGROUND OF THE INVENTION

Powder coating is a type of coating that is applied as a free-flowing, dry powder. (See, e.g., U.S. Pat. No. 2,538,562, the disclosure of which is incorporated herein by reference.) Unlike conventional liquid paint which is delivered via an evaporating solvent, powder coating is typically applied electrostatically and then cured under heat or with infrared light. The powder may be a thermoplastic or a thermoset polymer. It is usually used to create a hard finish that is tougher than conventional paint. Powder coating is mainly used for coating of metals, such as household appliances, aluminum extrusions, drum hardware, automobile, motorcycle, and bicycle parts. More advanced technologies allow other materials, such as plastics, composites, carbon fiber, and MDF (medium-density fiberboard), to be powder coated using different methods that require less heat and time.

BRIEF SUMMARY OF THE INVENTION

The application is directed to methods of applying powder coating finishes; and more particularly to methods of applying powder coating finishes to duplicate specific material patinas.

Various embodiments are directed to methods of depositing a powder coat faux finish including:

- cleaning and preheating a surface for finishing;
- depositing a primer powder coat material on the surface such that the entire surface is coated in a primer layer sufficiently thick to obscure the underlying surface material;
- heating the primer coated surface to a temperature sufficient to flash the primer powder coat material but not to fully polymerize the primer powder coat material;
- depositing a base color powder coat material on the heated primer coated surface such that the entire surface is coated in a base color layer sufficiently thick to obscure the underlying primer material;
- heating the base color coated surface to a temperature sufficient to flash the base color powder coat material but not to fully polymerize the base color powder coat material;

- cooling the base color coated surface to a temperature below the flash temperature;
- depositing a faux finish powder coat material on the cooled base color coated surface such that the entire surface is coated in a faux finish layer sufficiently thin such that the underlying base color powder coat material is visible through the faux finish layer;
- physically manipulating the faux finish layer such that a faux finish texture is imparted in the faux finish powder coat material of the faux finish layer;
- heating the faux finish coated surface to a temperature sufficient to flash the faux finish powder coat material but not to fully polymerize the faux finish powder coat material;
- repeating the faux finish cooling, depositing, physical manipulation and heating steps a number of times necessary to produce a desired faux finish effect;
- depositing a clear coat powder coat material on the heated faux finish surface such that the entire surface is coated in a clear coat layer sufficiently thick to obscure the underlying faux finish material; and
- heating the clear coated surface to a temperature sufficient to fully polymerize the powder coat materials deposited on the surface.

In various such embodiments the preheating step heats the surface to a temperature sufficient to outgas the surface.

In still various such embodiments the surface is cleaned by physically ablating the surface.

In yet various such embodiments the faux finish process is repeated at least once, and in other embodiments between one and three times, prior to depositing the clear coat powder coat material.

In still yet various such embodiments the physical texturing includes a techniques selected from the group consisting of sponging, washing, rag rolling, marbleizing, faux granite, strié, antiquing, lime washing, pickling, verdigris, brooming, stippling, and wood graining.

Many embodiments are directed to kits for performing a powder coat faux finish at least comprising a plurality of powder coat materials and at least one physical texturing tool suitable for producing the desired faux finish effect.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION OF THE INVENTION

Figure 1:
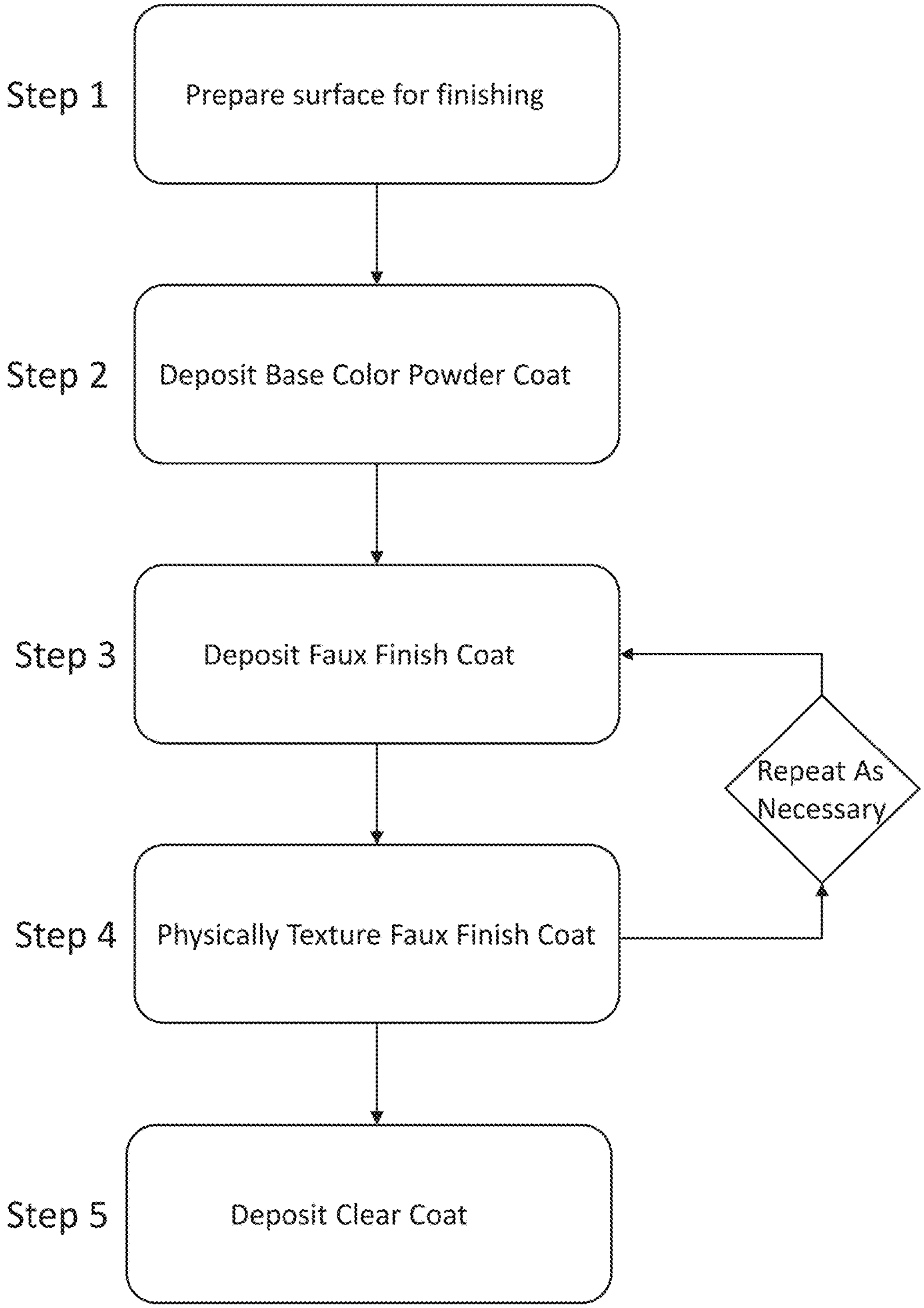
FIG. 1 provides a flow diagram of a method for applying a powder coated faux finish in accordance with embodiments of the invention.

The described methods, systems, and apparatus should not be construed as limiting in any way. Instead, the present disclosure is directed toward all novel and nonobvious features and aspects of the various disclosed embodiments, alone and in various combinations and sub-combinations with one another. The disclosed methods, systems, and apparatus are not limited to any specific aspect, feature, or combination thereof, nor do the disclosed methods, systems, and apparatus require that any one or more specific advantages be present or problems be solved.

Turning now to the drawings, methods and processes for applying powder coat faux finishes, and power coat materials associated with such methods and processes are provided. Many such embodiments employ one or more partial powder coat layers along with physical texturing techniques to provide a variety of powder coated faux finish effects. Methods according to embodiments may utilize standard powder coating formulations in contrasting combinations to form suitable faux finishes. Various embodiments may be used to recreate faux finishing techniques using powder coating previously only obtainable with wet techniques, such as, for example, sponging, color washing, rag rolling, marbleizing, faux granite, strié, antiquing, verdigris, wood graining, weathered patina, etc. Particular embodiments of methods and processes implementing specialized color pallets provide finishes that reproduce metal patinas including copper and brass, brushed metals, rust effects, and concrete, among others. Embodiments also encompass kits of materials, including powder coating materials and physical texturing equipment suitable to reproduce such faux finishes.

Decorative finish markets seek ready-made finishes that possess consistency throughout without terminal decay or fading. Powder coating generally provides many advantages over other types of coating technologies:

- Powder coatings contain no solvents and release little or no amount of volatile organic compounds (VOC) into the atmosphere. Thus, there is no need for finishers to buy costly pollution control equipment. Companies can comply more easily and economically with the regulations of the U.S. Environmental Protection Agency.
- Powder coatings can produce much thicker coatings than conventional liquid coatings without running or sagging.
- Powder coated items generally have fewer appearance differences than liquid coated items between horizontally coated surfaces and vertically coated surfaces.
- Curing time is significantly faster with powder coatings compared to liquid coatings especially when using ultraviolet, infrared or heat cured powder coatings Despite these significant advantages, conventional powder coating relies on industry standard single or two-coat systems to produce one color metal coating finishes. Attempts to develop more complex finishes have, in the past, relied on machination, such as sublimation, that is capital, time and labor intensive. Accordingly, the availability of aged, distressed & patinated finishes using powder coating is limited.

With the lack of availability of suitable powder coating techniques, the coatings industry typically relies on aqueous solutions such as chemical etching and liquid paint to reproduce various finishes. While many desired finishing effects can be created using these methods they have a number of failings. Specifically, current options in the market require the use of acids and other caustic chemical mixtures to create living finishes or depend on the use of faux painted finishes with limited wear. All of these techniques, whether they use coatings or paints use caustic chemicals or include solvents that are harmful to the environment and the applicator. Further, these wet techniques can slow production due to the long dry times required between the applications of coating layers. The cleanup of such techniques is also messy and may require extra floor space to allow for out-gassing or curing. The health and environmental impacts of these wet techniques is so notorious that some countries are limiting large scale production or even forbidding the use of such products, putting downward pressure on the production and the future of artistic finishes even while demand continues to grow.

Embodiments of the instant disclosure address the deficiencies in current faux finish coating techniques by implementing novel processes and methods that allow for the reproduction of a wide-variety of faux finishes and patinas using conventional powder coating equipment and materials. Unlike today's current applications that lend themselves to surface inefficiency, irregularity, and decay, effects using powder coating according to embodiments give architectural, automotive and home goods a more controlled evenness and realistic natural look. Processes and methods according to embodiment may be used to produce beautiful, realistic finishes without losing the toughness and durability the industry has come to expect from conventional powder coating applications, e.g., ultraviolet (UV), chemical, and scratch resistance. Using processes and methods according to embodiments, applicators have the ability to use industrial powder coatings as a creative force in the production of luxury looks during the manufacturing process. The methods according to embodiments exceed architectural expectations by mimicking the effects produced by traditional wet application methods without the processing complications and deleterious environmental/health concerns associated with those traditional methods.

Many embodiments are directed to methods and processes for reproducing faux finishes using conventional powder coating materials and equipment, flowcharts of such methods and processes are provided in FIGS. 1 to 5. As shown in FIG. 1, generally methods and processes comprise five basic steps: surface preparation, base color deposition, at least one combination of faux finish deposition and physical texturing, and clear coat deposition. Each of these steps of the methods and processes will be described in greater detail below, however, it will be understood that all of the processes described herein may use any conventional powder coating material and equipment.

Conventional powder coatings fall within three main categories: thermosets, thermoplastics, and UV or infrared (IR) curable powder coatings. Thermoset powder coatings incorporates a cross-linker into the formulation. When the powder is baked, it reacts with other chemical groups in the powder to polymerize, improving the performance properties. The thermoplastic variety does not undergo any additional actions during the baking process as it flows to form the final coating. UV-curable powder coatings are photopolymerisable materials containing a chemical photoinitiator that instantly responds to UV light energy by initiating the reaction that leads to crosslinking or cure. The differentiating factor of this process from others is the separation of the melt stage before the cure stage. UV-cured powder will melt in 60 to 120 seconds when reaching a temperature 110° C. and 130° C. Once the melted coating is in this temperature window it is instantly cured when exposed to UV light. Some common polymers, include, for example, polyesters, polyurethanes, polyester-epoxies (known as hybrids), straight epoxies (fusion bonded epoxies) and acrylics. It will be understood that any of these materials may be used with the processes and methods of the instant embodiments.

The most common equipment used for applying powder coatings is to spray the powder using an electrostatic or corona gun. These guns impart a negative charge to the powder, which is then sprayed towards the grounded object by mechanical or compressed air spraying and then accelerated toward the work piece by the powerful electrostatic charge. There is a wide variety of spray nozzles available for use in electrostatic coating. The type of nozzle used will depend on the shape of the work piece to be painted and the consistency of the paint. The object is then heated, and the powder melts into a uniform film, and is then cooled to form a hard coating. It is also common to heat the metal first and then spray the powder onto the hot substrate. Preheating can help to achieve a more uniform finish but can also create other problems, such as runs caused by excess powder. Another type of gun is called a tribo gun, which charges the powder by (triboelectric) friction. In this case, the powder picks up a positive charge while rubbing along the wall of a Teflon tube inside the barrel of the gun. These charged powder particles then adhere to the grounded substrate. Using a tribo gun requires a different formulation of powder than the more common corona guns. Tribo guns are not subject to some of the problems associated with corona guns, however, such as back ionization and the Faraday cage effect. Powder can also be applied using specifically adapted electrostatic discs. It will be understood that any of these equipment types may be used with the processes and methods of the instant embodiments.

Embodiment Implementations of Surface Preparation Techniques

Turning to the figures, as shown in FIG. 1, surfaces to be finished according to method and processes are put through a surface preparation procedure. Many embodiments of surface preparation procedures are summarized in FIG. 2. As shown, as an initial step, the surface of the material to be finished is cleaned. Removal of oil, dirt, lubrication greases, metal oxides, welding scale etc. can be important prior to the powder coating process. Many embodiments incorporate one or more cleaning process prior to coating, including, for example, chemical and mechanical methods.

Chemical pre-treatments typically involve the use of phosphates, chromates, silanes, titanium zirconium, etc. in submersion or spray application. These often occur in multiple stages and consist of degreasing, etching, de-smutting, various rinses and the final phosphating, chromating, etc. of the substrate & new nanotechnology chemical bonding. In many high end applications, the part is electro coated following the pretreatment process, and subsequent to the powder coating application. This has been particularly useful in automotive and other applications requiring high end performance characteristics.

Mechanical methods of pre-treatment including abrasive blasting or sandblasting and shot blasting. Blast media and blasting abrasives are used to provide surface texturing and preparation, etching, finishing, and degreasing for products made of wood, plastic, or glass. The most important properties to consider are chemical composition and density; particle shape and size; and impact resistance. For example, silicon carbide grit blast medium is brittle, sharp, and suitable for grinding metals and low-tensile strength, non-metallic materials. Plastic media blast equipment uses plastic abrasives that are sensitive to substrates such as aluminum, but still suitable for de-coating and surface finishing. Sand blast medium uses high-purity crystals that have low-metal content. Glass bead blast medium contains glass beads of various sizes. Cast steel shot or steel grit is used to clean and prepare the surface before coating. Shot blasting recycles the media and is environmentally friendly. This method of preparation is highly efficient on steel parts such as I-beams, angles, pipes, tubes and large fabricated pieces. Another method of preparing the surface prior to coating is known as abrasive blasting or sandblasting and shot blasting. Blast media and blasting abrasives are used to provide surface texturing and preparation, etching, finishing, and degreasing for products made of wood, plastic, or glass. The most important properties to consider are chemical composition and density; particle shape and size; and impact resistance.

Finally, a recent development for the powder coating industry is the use of plasma pretreatment for heat sensitive plastics and composites. These materials typically have low-energy surfaces, are hydrophobic, and have a low degree of wettability which all negatively impact coating adhesion. Plasma treatment physically cleans, etches, and provides chemically active bonding sites for coatings to anchor to. The result is a hydrophilic, wettable surface that is amenable to coating flow and adhesion.

Although a number of individual surface preparation techniques are described above, it will be understood that any suitable surface preparation technique or combination of surface preparation techniques may be used in accordance with embodiments. Provided that the surface is sufficiently impurity free to provide the desired faux finish effect, the selection of the method according to embodiments depends on the size and the material of the part to be powder coated, the type of impurities to be removed and the performance requirement of the finished product.

Figure 2:
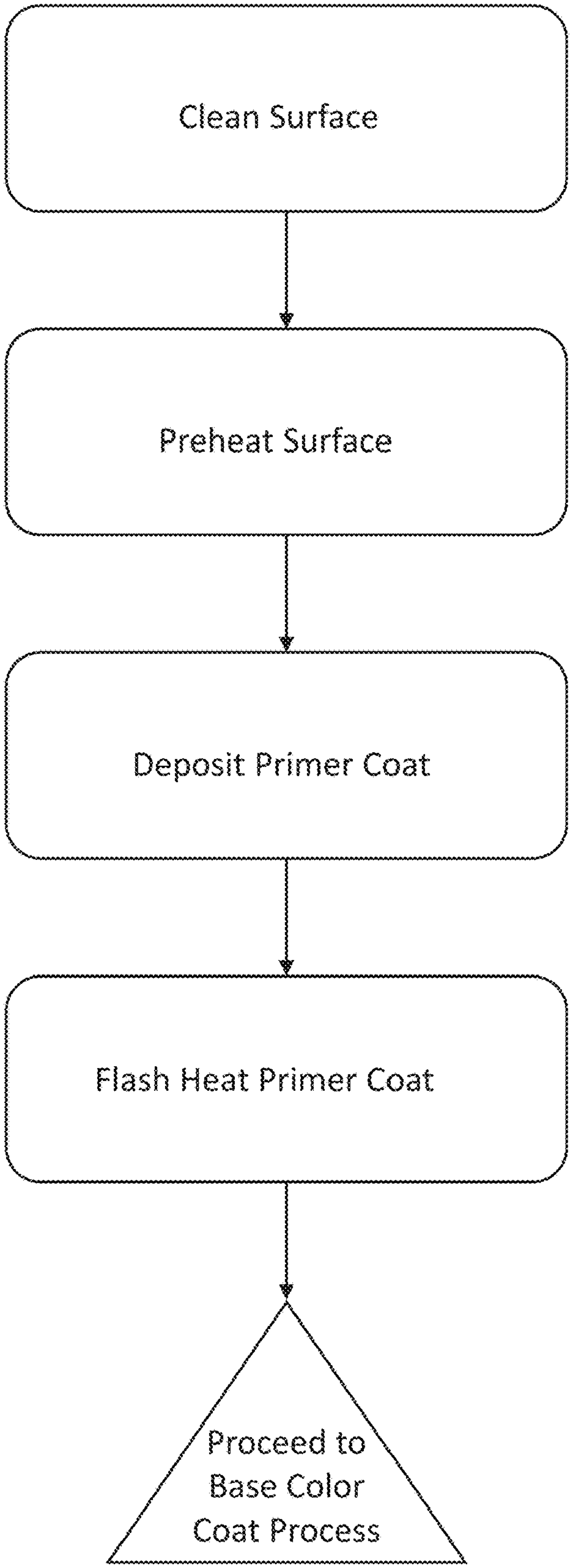
FIG. 2 provides a flow diagram of a method for applying a primer powder coat in accordance with embodiments of the invention.
Figure 3:
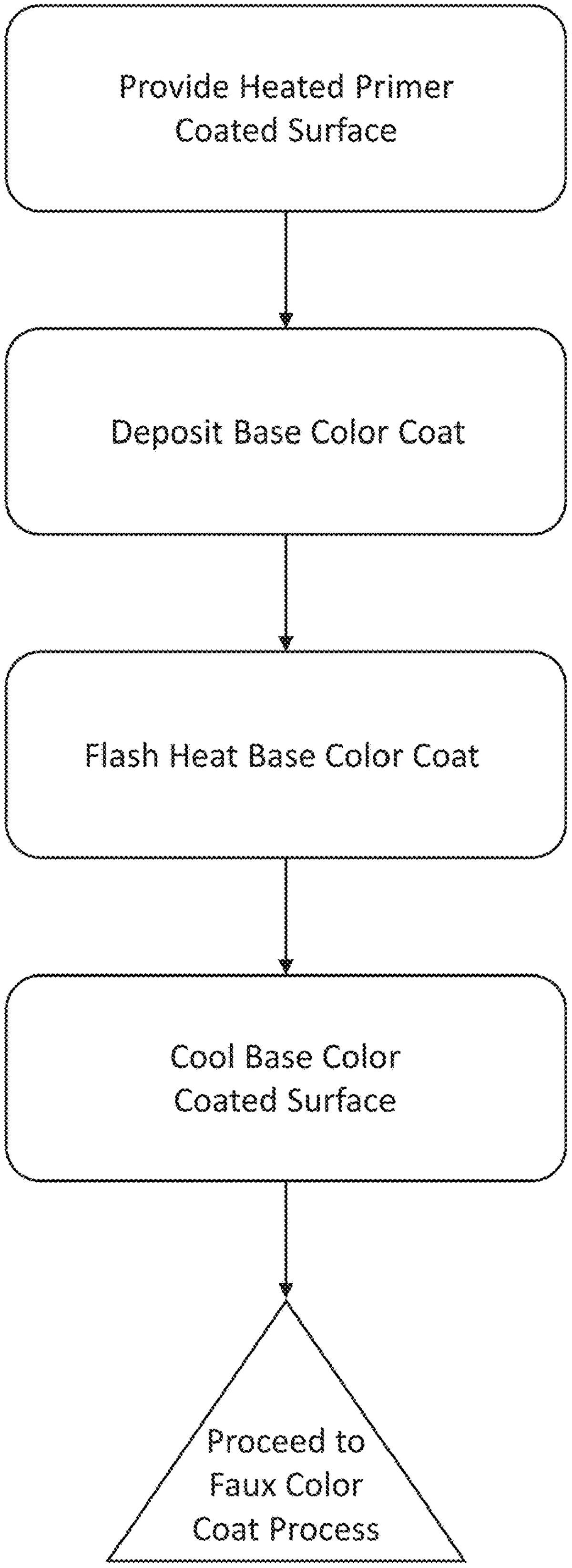
FIG. 3 provides a flow diagram of a method for applying a base color powder coat in accordance with embodiments of the invention.
Figure 4:
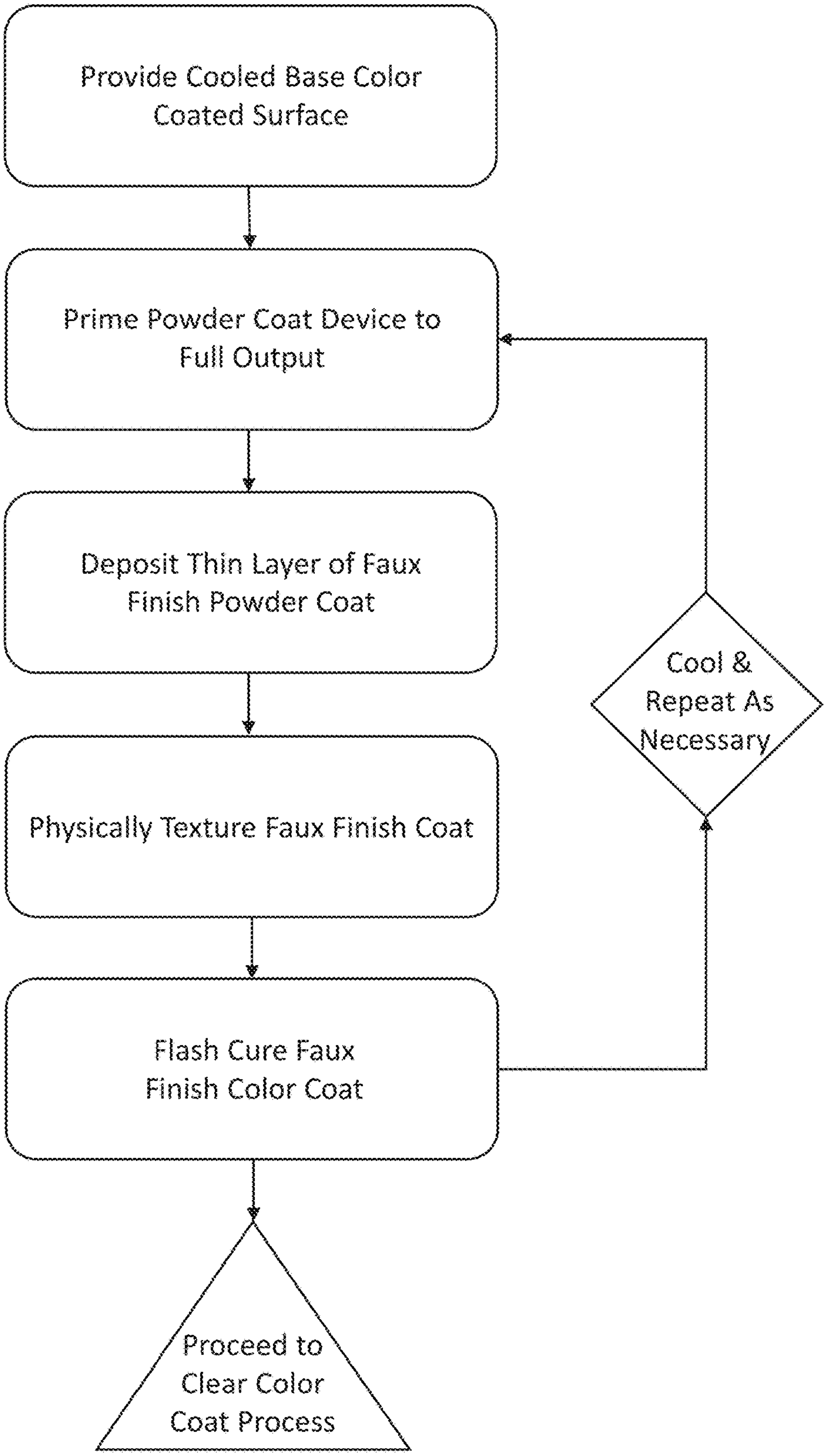
FIG. 4 provides a flow diagram of a method for applying faux finish powder coats in accordance with embodiments of the invention.

In many embodiments, as shown in FIG. 2, once the surface has been cleaned, the surface is preheated to prevent outgassing during the deposition of the faux finish. Outgassing occurs when trapped gases are leased through a powder coat during a cure process. When the gas passes through the coating it can form pinholes, which can be vectors for moisture or corrosive materials to penetrate the coating and corrode the part. Pinholes can also be unsightly and ruing the surface finish of the parts. Accordingly, in various embodiments the cleaned surface is heated to a temperature above the highest cure temperature of the powder coat materials to be applied to the finished surface such that any gas that would be released during future coat/cure steps is released prior to the deposition of the application of the first coating material.

Turning back to the flowchart in FIG. 2, once the cleaned surface is preheated, in many embodiments the surface of the material primed using a suitable powder coating primer. A powder coat primer is generally applied to provide a defect free surface that is corrosion resistant and will meet appearance requirements for the final surface. Any suitable powder coating primer may be used in accordance with this deposition step including any suitable color and material, such as, for example, epoxy or urethane primers among others. During deposition of the primer the entire surface to be finished according to embodiments is coated with a sufficient thickness of primer material to ensure a continuous layer covers the substrate surface.

As shown in FIG. 2, the last step of the surface preparation process according to many embodiments includes heating the prime red surface such that it flashes. Flashing in the context of this disclosure should be understood to mean a partial or incomplete cure of the powder coat material. Many materials, such as, for example, thermosetting materials or thermoset powders, include resins and cross linkers in the binder system that when heated to a specific "curing temperature" polymerize of the coating, converting the powder coat material from a dry state to a solid continuous film to create a coating with the desired molecular weight and physical properties. A flash cure in accordance with the current disclosure, occurs when the powder coating liquefies or "flashes over" so that it flows over the surface forming a continuous layer from the powderized material, but where the powder coat material is not fully polymerized to its full cure state. Typically, when a coating starts to flash over or liquefy this is an indicator that a powder coat material is at its polymerization or cure temperature, but since the full polymerization of the powder coat material occurs over an extended time at this cure temperature, it can be ceased prior to reaching a full cure. The temperature any material needs to reach to fully cure, i.e., create a final, solid continuous film in which the binder system is fully polymerized, will depend on the material. These temperature and curing conditions are generally provided by the material manufacturer. Accordingly, in many embodiments the primer coating is flash cured, i.e., brought to its cure temperature such that it flows and partially sets and is then cooled prior to full polymerization of the primer powder coat material. In various embodiments, a flash coating is obtained by heating the primer coated surface to a temperature between 380-400° F. for less than 10 minutes.

Embodiment Implementations of Base Coat Deposition Processes

Turning back to the overall powder coat faux finish process, as shown in FIG. 1, according to many embodiments once a surface is prepared, a base color powder coat is deposited on the prepared surface. The details of methods and processes for depositing a base color coat according to various embodiments is summarized in the flow chart provided in FIG. 3. As shown, in many embodiments the base color coat is deposited on the surface in a heated state, e.g., immediately after the primer coat is flash cured during the surface preparation process before the surface has a chance to cool to room temperature. Maintaining the surface in the heated state during the base color coat deposition allows for the better coating of the surface and a faster overall deposition process.

It will be understood that the base color coat may be deposited using any of the conventional power coating techniques described in reference to the deposition of the primer coat in the above surface preparation section of the disclosure provided a sufficient thickness of base color material is deposited to form a complete, solid, continuous layer coating the surface. Similarly, any suitable base color powder coat material capable of creating such a complete, solid, continuous layer coating may be used in association with the processes and methods according to embodiments. Exemplary types of color powder coat materials may include, but are not limited to, thermosets, thermoplastics, and UV curable powder coatings that may use any suitable polymer binders, including, but not limited to, polyester, polyurethane, polyester-epoxy (known as hybrid), straight epoxy (fusion bonded epoxy) and acrylics.

Once the base color coating layer has been deposited, the surface is again heated to a temperature sufficient to flash cure the base color powder coat, i.e., brought to its cure temperature such that it flows and then cooled prior to full polymerization of the primer powder coat material. In various embodiments, a flash coating is obtained by heating the primer coated surface to a temperature between 380-400° F. for less than 10 minutes.

After the base color coated surface is flash cured, it is allowed to cool. It will be understood that while it is not essential to fully cool the surface to room temperature, the surface should be cooled to a temperature sufficiently below the flash temperature of the powder coat materials to avoid flashing of any additional materials applied to the surface prior to applying the first faux finish powder coat material.

Embodiment Implementations of Faux Finish Deposition Processes

Turning back to the overall powder coat faux finish process, as shown in FIG. 1, according to many embodiments once a surface is prepared and a base color powder coat deposited, a series of faux finish effects are applied to the base color coated surface. The details of methods and processes for applying one or more faux finish effects to the base color coated surface according to various embodiments is summarized in the flow chart provided in FIG. 4.

As shown, in many embodiments the cooled base color coated surface is provided and a thin layer of a faux finish powder coat applied. To ensure that the coating is applied in as even a manner as possible, in many embodiments the powder coating application device is primed to full output prior to deposition of the faux powder coat layer. During deposition it is essential that a "thin" or incomplete faux finish powder coat layer or dusting of powder coat material is applied. For the purposes of this disclosure "thin" or "incomplete" means that the faux finish powder coat material is deposited in a thickness such that the underlying base color coat is visible through the overlaid faux finish powder coat layer. In some embodiments such a dusting or thin layer may be formed by issuing a small cloud of powder near the surface by holding the powder spray equipment from about 2 to 3 feet away from the surface to be coated.

Once the material has been deposited, and prior to any curing, the faux finish layer is physically textured using a suitable technique to create the faux finish effect desired in the material. Physical texturing techniques may include, but are not limited to the following:

Dabbing: pressing a physical tecturing implement into the dry/cold surface to remove material previously applied.

Swiping: applying a side-to-side motion using an implement to streak the surface material.

Blending: using an implement to mottle the surface or smooth out a flaw in the layer prior to curing.

Chunking: an effect created when there is too a large build up of powder coat material on the surface prior to curing.

Brooming: using various brush filaments in combination with sweeping motions to create specific effects.

Stippling: using various implements to create a pattern of dots on the surface material.

Although the above has described specific techniques, it will be understood that any suitable physical texturing effect may be applied to the faux finish powder coat material, including, but not limited to, sponging, washing, rag rolling, marbleizing, faux granite, strié, antiquing, lime washing, pickling, verdigris, wood graining, brooming, stippling, etc. Regardless of the specific faux surface to be created, the appropriate physical implement is applied as appropriate and known in the art to the uncured faux finish powder coat to impart the desired pattern. (Exemplary physical texturing techniques are provided in Table 1, below. It is to be understood that this list is not meant to be taken as exhaustive, but is provided to demonstrate the versatility of the technique and its ability to reproduce a wide variety of faux finishes.)

TABLE 1

| Faux Finish Texturing Techniques | |
|---|---|
| Sponging | Using an appropriate sponge (e.g., sea sponge) lightly dab the faux finish powder coat layer in a random pattern on the surface. To achieve a subtle effect, use a faux finish powder coat color from the same color family of the base color. For a bolder effect, use a faux finish powder coat color from a different color group |
| Color Washing | Using a rag or sponge apply a wiping or circular motion-like washing the wall. |
| Rag Rolling | Twist or bunch up a rage and roll the rag across the surface. This will irregularly remove the faux finish powder coat material and create the desired effect. |
| Marbleizing | Using a painting sponge or a bunched up rag create a mottling, or blotchy marble pattern by dabbing and smearing the faux finish powder coat layer on the surface. The pattern should be randomized across the surface. Using other colors (as will be described later), such as white, gray or black move a brush across the surface with uneven, diagonal strokes making "Y" or "K" shapes, taking care to not make them too straight or too uniform. |
| Granite | Use a sponge to create splotches in the faux finish powder coat layer your base coat across the entire surface of the countertop. As with faux marble, dab and smear the faux finish powder coat layer with the sponge. Repeat this process with multiple colors (as will be described below). |
| Strié | Lightly drag a large, long-bristled paintbrush through the faux finish powder coat layer from top to bottom in long, soft, vertical strokes. Wipe the brush clean on a rag and then repeat the process along the rest of the wall, slightly overlapping the previous section each time. |
| Antiquing | Using a piece of cloth wipe away the faux finish powder coat layer in long, even strokes. Replace the cloth with a clean one when it becomes too saturated. It is also possible to wipe off the mixture with rolled-up plastic wrap, newspaper or cheesecloth for different textures and effects. |
| Pickling Wood | Start by sanding the surface with medium-grit sandpaper to create a roughness in the underlying base coat powder coat layer. After the faux finish powder coat layer has been applied, use a clean dry cloth to rub the faux finish material into the textures surface against the created grain. Use a second rag to wipe along the grain to remove excess faux finish powder coat material. |
| Verdigris | After applying a base color powder coat of a desired metallic hue (e.g., copper or gold). Apply first and second faux finish powder coat layers of contrasting green (e.g., dark and light) and texture using a sponge, feather duster and/or rag as described above. The pattern should be applied irregularly to mimic a natural effect. |
| Wood Graining | Using a wood grain rocker to create a wood grain effect in the faux finish powder coat layer. |
| Brooming | Using a natural or polystyrene bristled brush to move layers across the surface. |
| Stippling | The creation of a pattern simulating varying degrees of solidity or shading by using small dots. |

Regardless of the specific technique to be used it will be understood that multiple faux finish powder coat layers with specifically desired physical texturing may be combined atop the base color powder coat layer in an iterative fashion. Specifically, as summarized in FIG. 4, in such multicoating procedures each faux finish powder coat is deposited in a like manner. The chosen faux finish powder coat material is provided in the deposition apparatus, the apparatus is primed to full output and then a thin/incomplete layer of the faux finish powder coat material is deposited, physically textured, the layer is flash cured, and allowed to cool before deposition of the next faux finish powder coat layer. Each of these steps may be conducted in accordance with the procedures described above.

In addition, any suitable combination of powder coat materials may be used. It will be understood that in most applications the specific faux finish powder coat materials will be chosen based on a specific color or texture effect that there is a desire to reproduce. For example, in the case of a copper verdigris faux finish a base copper color coat would be applied and then a series of contrasting (e.g., darker or lighter) green faux finish powder coat materials would be applied and physically textured to simulate the patina of weather aged copper. As long as the powder coat material is suitable for use in a powder coat process, and is compatible with the other chosen materials, it may be used in accordance with the embodiments of the disclosure.

Embodiment Implementations of Clear Coat Processes

Turning back to the overall powder coat faux finish process, as shown in FIG. 1, according to many embodiments once a surface is prepared, a base color powder coat deposited, and a series of faux finish effects applied to the base color coated surface, a clear coat material is disposed atop the complete faux finish surface. The clear coat has the effect of pulling the various layers together and sealing them against wear and damage. The details of methods and processes for applying a clear coat to the faux finished surface according to various embodiments is summarized in the flow chart provided in FIG. 5.

Figure 5:
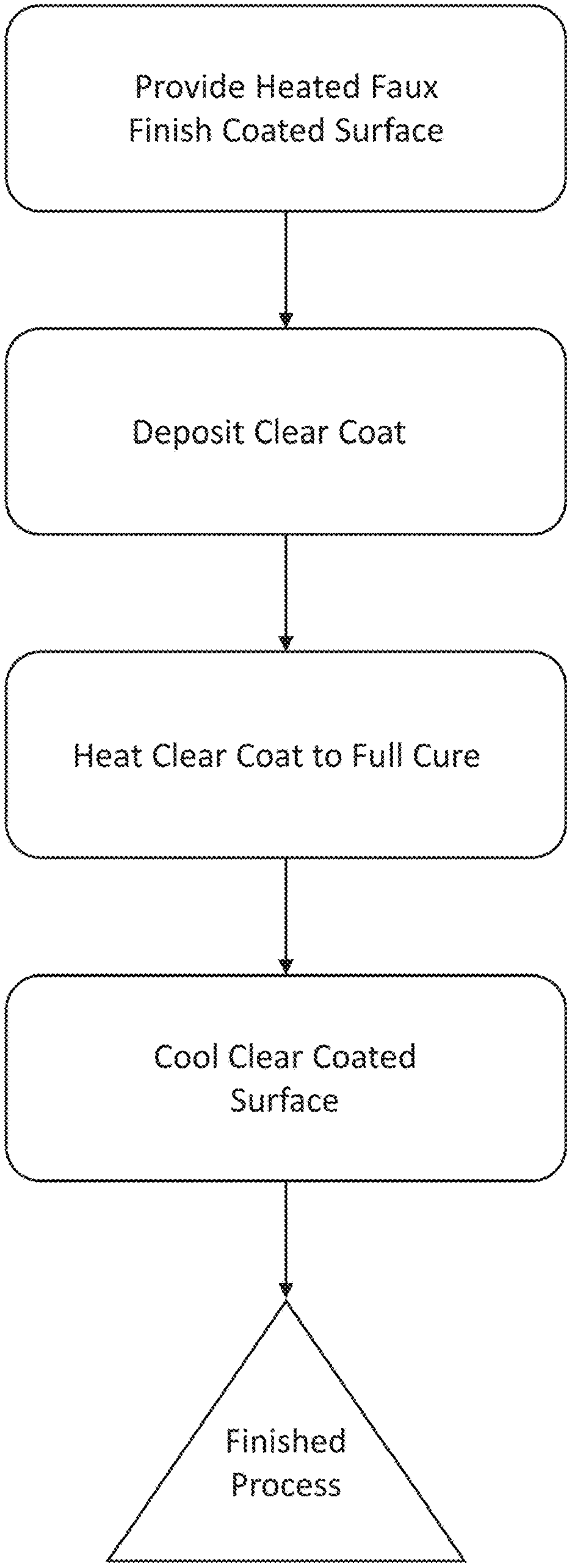
FIG. 5 provides a flow diagram of a method for applying a clear powder coat in accordance with embodiments of the invention.

In many embodiments, as summarized in FIG. 5, the complete faux finished surface is provided in a heated state and a clear coat material is applied across the entire surface. Unlike the thin or incomplete layers of the faux finish, the clear coat materials is applied in a thickness sufficient to fully cover the entire surface such that the faux finish surface is fully covered and obscured beneath the uncured clear coat layer. Once a suitable thickness of clear coat has been deposited, the surface is then heated to a sufficient temperature and sufficiently long to ensure that the clear coat and all underlying layers disposed on the surface are fully cured. In many embodiments, this can mean raising the temperature of the surface to between 380 and 400 OF and holding the temperature for 20 to 25 minutes. Although an exemplary cure time has been given it will be understood that the actual cure time of a material may vary and that the conditions to ensure the material is fully cured may be obtained from the material manufacturer.

Embodiments Implementing Faux Finish Powder Coat Kits

Although the above discussion has focused on methods and processes for producing faux finishes using conventional powder coat materials and equipment, it will be understood that embodiments may also be directed to kits comprising powder spray equipment, suitable physical texturing apparatus, and combinations of powder coat materials for providing the primer, base color and contrasting faux finish colors to recreate a desired faux finish effect.

EXEMPLARY EMBODIMENTS

The following embodiments are provided as examples of some surface effects that may be reproduced according to embodiments and should not be construed as limiting the scope of the disclosure in any way.

Example 1: Copper Verdigris Patina

Figure 6A:
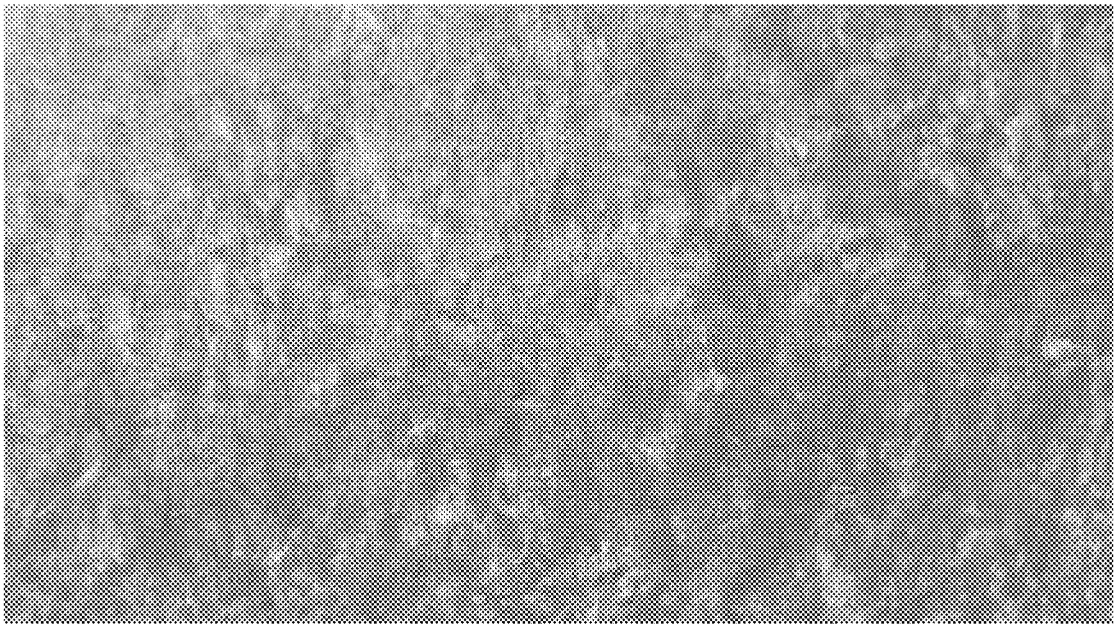
FIGS. 6A to 6F provide images of exemplary powder coated faux finishes in accordance with embodiments of the invention.

FIG. 6A provides an image of a copper verdigris faux finish produced in accordance with embodiments.

Example 2: Rust Strié

Figure 6B:
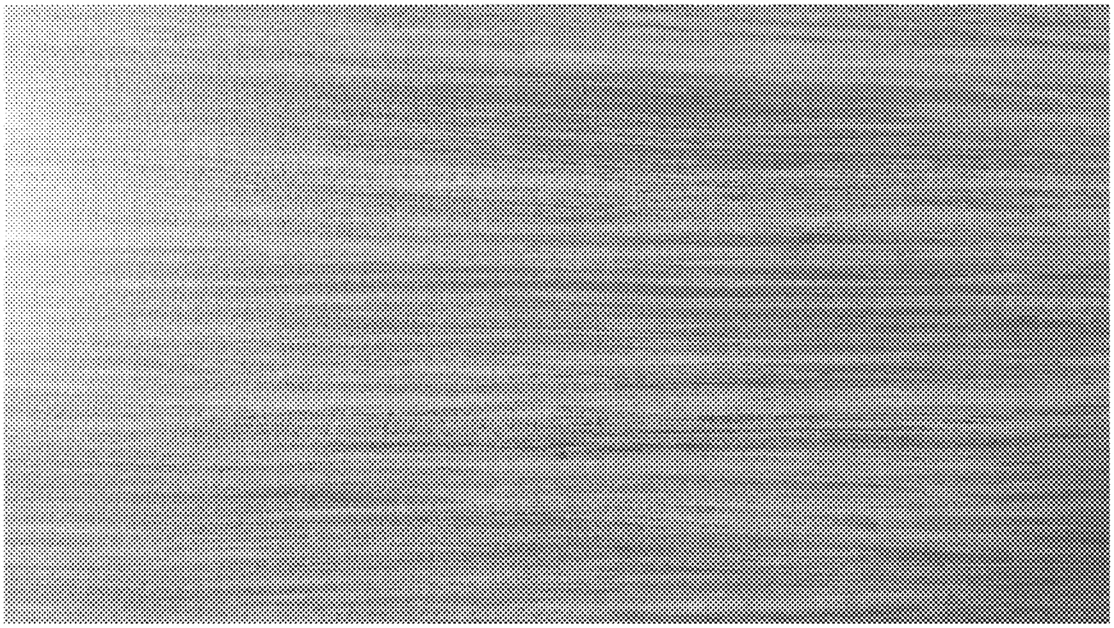

FIG. 6B provides an image of a rust strié faux finish produced in accordance with embodiments.

Example 3: Grayed Wood Grain

Figure 6C:
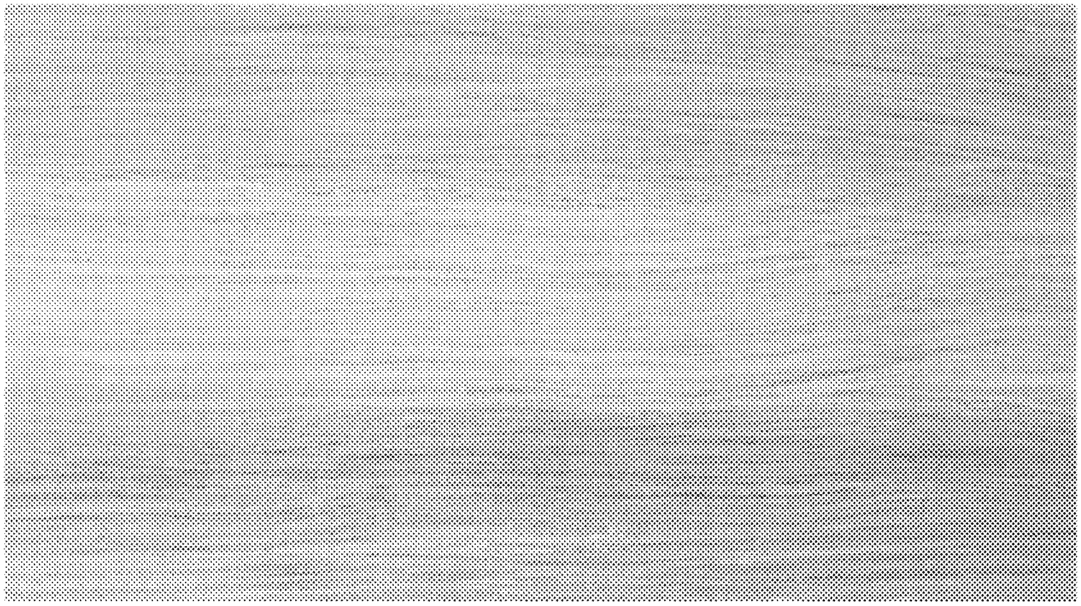

FIG. 6C provides an image of a grayed woods grain faux finish produced in accordance with embodiments.

Example 4: Concrete

Figure 6D:
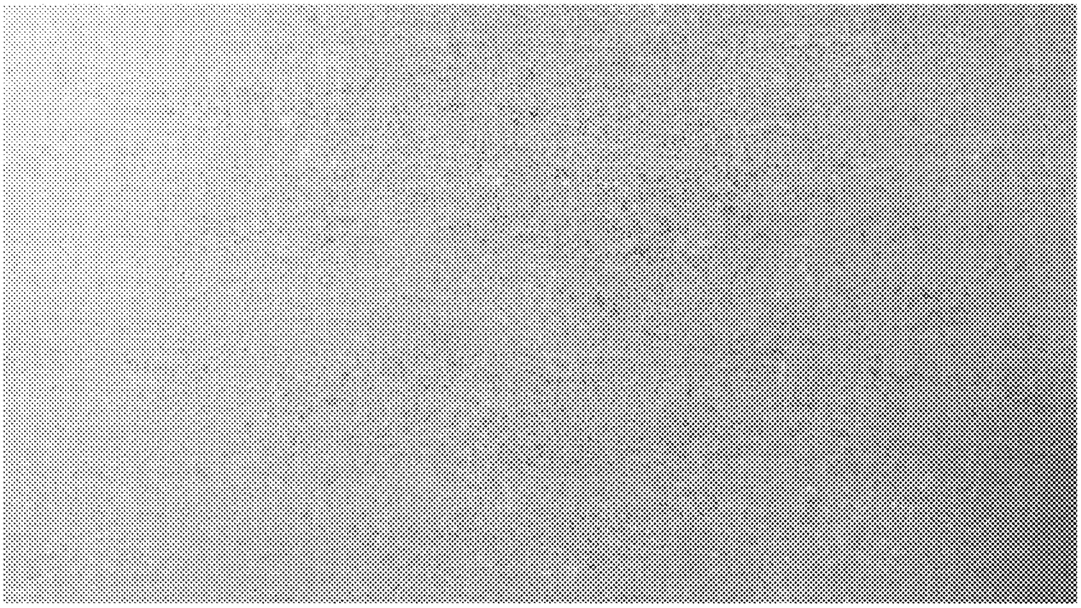

FIG. 6D provides an image of a concrete faux finish produced in accordance with embodiments.

Example 5: Granite

Figure 6E:
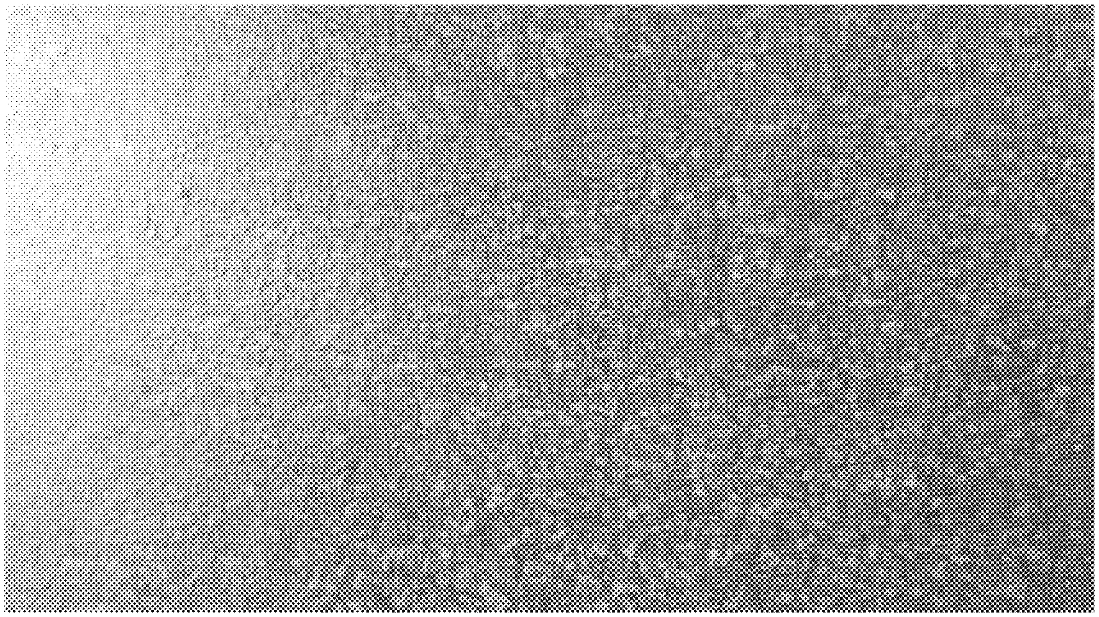

FIG. 6E provides an image of a granite faux finish produced in accordance with embodiments.

Example 6: Brushed Bronze

Figure 6F:
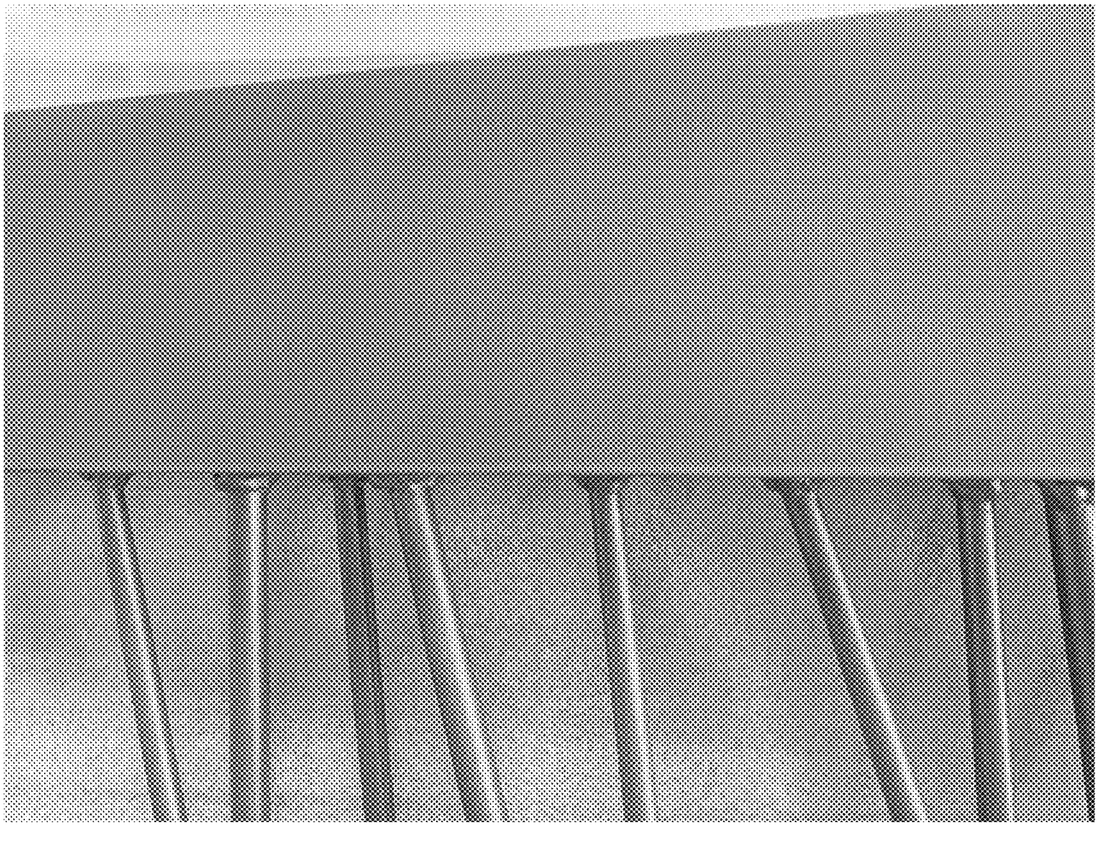

FIG. 6F provides an image of a brushed bronze faux finish produced in accordance with embodiments.

DOCTRINE OF EQUIVALENTS

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A method of depositing a powder coat faux finish comprising:

cleaning and preheating a surface for finishing;

depositing a primer powder coat material on the surface such that the entire surface is coated in a primer layer sufficiently thick to obscure the underlying surface material;

heating the primer coated surface to a temperature sufficient to flash the primer powder coat material but not to fully polymerize the primer powder coat material;

depositing a base color powder coat material on the heated primer coated surface such that the entire surface is coated in a base color layer sufficiently thick to obscure the underlying primer material to form a base color coated surface;

heating the base color coated surface to a temperature sufficient to flash the base color powder coat material but not to fully polymerize the base color powder coat material;

cooling the base color coated surface to a temperature below the flash temperature;

depositing a faux finish powder coat material on the cooled base color coated surface such that the entire surface is coated in a faux finish layer sufficiently thin such that the underlying base color layer is visible through the faux finish layer;

physically manipulating the faux finish layer such that a faux finish texture is imparted in the faux finish powder coat material of the faux finish layer;

heating the faux finish coated surface to a temperature sufficient to flash the faux finish powder coat material but not to fully polymerize the faux finish powder coat material;

repeating the faux finish cooling, depositing, physical manipulation and heating steps a number of times necessary to produce a desired faux finish effect;

depositing a clear coat powder coat material on the heated faux finish surface such that the entire surface is coated in a clear coat layer sufficiently thick to obscure the underlying faux finish material; and heating the clear coated surface to a temperature sufficient to fully polymerize the powder coat materials deposited on the surface.

2. The method of claim 1, wherein the preheating step heats the surface to a temperature sufficient to outgas the surface.

3. The method of claim 1, wherein the surface is cleaned by a method selected from the group of physically ablating the surface, chemically pre-treating the surface or plasma pretreatment.

4. The method of claim 1, wherein the primer coated and base color coated surfaces are flashed by heating to a temperature of between about 380 and 400° F. for less than 10 minutes.

5. The method of claim 1, wherein the faux finish process is repeated at least one time prior to depositing the clear coat powder coat material.

6. The method of claim 1, wherein the faux finish process is repeated at least three times prior to depositing the clear coat powder coat material.

7. The method of claim 1, wherein the physical texturing includes a technique selected from the group consisting of dabbing, swiping, blending, chunking, brooming and stippling.

8. The method of claim 1, wherein the at least one of the powder coat materials is selected from the group consisting of: thermosets, thermoplastics and curable powder coatings.

9. The method of claim 1, wherein the deposition is performed using one of either an electrostatic or tribo powder coating gun.

10. The method of claim 9, wherein the faux finish powder coating is deposited by holding the powder coating gun from about 2 to 3 feet away from the base color coated surface during deposition.

11. The method of claim 1, wherein the faux finish effect is selected from the group consisting of: sponging, washing, rag rolling, marbleizing, faux granite, strié, antiquing, lime washing, pickling, verdigris, brooming, stippling, and wood graining.

12. The method of claim 1, wherein the clear coated surface is heated to a temperature between about 380 to 400° F. for between about 20 to 25 minutes.

* * * * *